(12) United States Patent
Wang et al.

(10) Patent No.: US 7,009,594 B2
(45) Date of Patent: Mar. 7, 2006

(54) UNIVERSAL COMPUTING DEVICE

(75) Inventors: Jian Wang, Beijing (CN); ChunHui Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 390 days.

(21) Appl. No.: 10/284,417

(22) Filed: Oct. 31, 2002

(65) Prior Publication Data

US 2004/0085286 A1 May 6, 2004

(51) Int. Cl.
*G09G 5/00* (2006.01)
(52) U.S. Cl. ....................................... 345/156; 345/179
(58) Field of Classification Search ................. 345/173, 345/156, 179, 589, 634, 619; 713/176; 715/863, 503; 348/14.01; 358/1.15; 382/161, 382/100, 185; 235/462.45, 494, 100; 434/322; 286/46; 706/13
See application file for complete search history.

(56) References Cited

U.S. PATENT DOCUMENTS

| | | | |
|---|---|---|---|
| 4,829,583 A * | 5/1989 | Monroe et al. ............. 382/185 |
| 5,247,137 A | 9/1993 | Epperson |
| 5,294,792 A | 3/1994 | Lewis et al. |
| 5,587,558 A | 12/1996 | Matsushima |
| 5,644,652 A | 7/1997 | Bellegarda et al. |
| 5,661,506 A | 8/1997 | Lazzouni et al. |
| 5,686,718 A * | 11/1997 | Iwai et al. .................. 235/494 |
| 5,754,280 A | 5/1998 | Kato et al. |
| 5,756,981 A * | 5/1998 | Roustaei et al. ....... 235/462.42 |
| 5,774,602 A | 6/1998 | Taguchi et al. |
| 5,822,465 A | 10/1998 | Normile et al. |
| 5,855,483 A * | 1/1999 | Collins et al. ............. 434/322 |
| 5,898,166 A | 4/1999 | Fukuda et al. |
| 5,902,968 A | 5/1999 | Sato et al. |
| 5,960,124 A | 9/1999 | Taguchi et al. |
| 5,995,084 A * | 11/1999 | Chan et al. ................. 345/173 |
| 6,005,973 A | 12/1999 | Seybold et al. |
| 6,081,261 A | 6/2000 | Wolff et al. |
| 6,141,014 A | 10/2000 | Endo et al. |
| 6,157,935 A * | 12/2000 | Tran et al. .................. 715/503 |
| 6,202,060 B1 * | 3/2001 | Tran ............................. 707/3 |
| 6,226,636 B1 | 5/2001 | Abdel-Mottaleb et al. |
| 6,243,071 B1 | 6/2001 | Shwarts et al. |
| 6,278,968 B1 | 8/2001 | Franz et al. |
| 6,335,727 B1 | 1/2002 | Morishita et al. |
| 6,577,299 B1 | 6/2003 | Schiller et al. |
| 6,585,154 B1 | 7/2003 | Ostrover et al. |
| 6,731,271 B1 | 5/2004 | Tanaka et al. |
| 6,744,967 B1 * | 6/2004 | Kaminski et al. ............. 386/46 |
| 6,752,317 B1 * | 6/2004 | Dymetman et al. .... 235/462.45 |
| 6,847,356 B1 | 1/2005 | Hasegawa et al. |

(Continued)

FOREIGN PATENT DOCUMENTS

EP     0 407 734     1/1991

(Continued)

OTHER PUBLICATIONS

Internet printout—http:/www.anotofunctionality.com: Anoto Functionality—How does it work?, Sep. 26, 2002.

(Continued)

*Primary Examiner*—Vijay Shankar
*Assistant Examiner*—Prabodh Dharia
(74) *Attorney, Agent, or Firm*—Banner & Witcoff Ltd

(57) ABSTRACT

A universal input device is described. The universal input device provides a common user interface for a variety of different computing platforms including printed documents. Using the present system, one may use the universal input device to control various computing devices as well as capture handwritten electronic ink and have the electronic in be associated with new or stored documents.

1 Claim, 8 Drawing Sheets

U.S. PATENT DOCUMENTS

| | | | |
|---|---|---|---|
| 2001/0024193 A1 | 9/2001 | Fahraeus | |
| 2002/0024499 A1* | 2/2002 | Karidis et al. | 345/156 |
| 2002/0069220 A1* | 6/2002 | Tran | 707/503 |
| 2002/0148655 A1 | 10/2002 | Cho et al. | |
| 2002/0163510 A1 | 11/2002 | Williams et al. | |
| 2002/0163511 A1 | 11/2002 | Sekendur | |
| 2003/0063045 A1 | 4/2003 | Fleming | |
| 2003/0063072 A1* | 4/2003 | Brandenberg et al. | 345/173 |
| 2003/0146883 A1 | 8/2003 | Zelitt | |
| 2004/0032393 A1* | 2/2004 | Brandenberg et al. | 345/156 |
| 2004/0046744 A1 | 3/2004 | Rafii et al. | |
| 2004/0136083 A1* | 7/2004 | Wang et al. | 359/642 |
| 2004/0140964 A1* | 7/2004 | Wang et al. | 345/179 |
| 2004/0140985 A1* | 7/2004 | Wang et al. | 345/179 |
| 2004/0143559 A1* | 7/2004 | Ayala | 706/13 |
| 2004/0153649 A1* | 8/2004 | Rhoads et al. | 713/176 |
| 2005/0024324 A1 | 2/2005 | Tomasi et al. | |
| 2005/0052469 A1* | 3/2005 | Crosby et al. | 345/619 |

FOREIGN PATENT DOCUMENTS

| | | |
|---|---|---|
| EP | 0 717 368 A | 6/1996 |
| EP | 0 732 666 | 9/1996 |
| EP | 0 865 166 | 9/1998 |
| EP | 1 158 456 | 11/2001 |
| WO | WO 01/26032 A | 4/2001 |
| WO | WO 01/48685 | 7/2001 |
| WO | WO 01/71654 | 9/2001 |
| WO | WO 02/077870 | 10/2002 |

OTHER PUBLICATIONS

Internet printout—http:/www.anotofunctionality.com: Anoto Functionality—Anoto pattern & digital paper, Sep. 26, 2002.
Internet printout—http:/www.anotofunctionality.com: Anoto Functionality—Digital pens, Sep. 26, 2002.
Internet printout—http:/www.anotofunctionality.com: Anoto Functionality—Digital pens Use with personal computers, Sep. 26, 2002.
Internet printout—http:/www.anotofunctionality.com: Anoto Functionality—What is Anoto functionality?, Sep. 5, 2003.
Internet printout—http:/www.anotofunctionality.com: Anoto Functionality—Anoto pattern & digital paper, Sep. 5, 2003.
Internet printout—http:/www.anotofunctionality.com: Anoto Functionality—Digital pens Use with mobile phones, Sep. 5, 2003.
Internet printout—http:/www.anotofunctionality.com: Anoto Functionality—Security, Sep. 5, 2003.
Internet printout—http:/www.anotofunctionality.com: Anoto Functionality—Applications, Sep. 5, 2003.
Internet printout—http:/www.anotofunctionality.com: Anoto Functionality—E-mail, Sep. 5, 2003.
Internet printout—http:/www.anotofunctionality.com: Anoto Functionality—Fax,—E-mail, Sep. 5, 2003.
Internet printout—http:/www.functionality.com: Anoto Functionality—Graphical SMS, Sep. 5, 2003.
Internet printout—http:/www.functionality.com: Anoto Functionality—Digital Notes, Sep. 5, 2003.
Internet printout—http:/www.functionality.com: Anoto Functionality—Corporate applications, Sep. 5, 2003.
Internet printout—http:/www.functionality.com: Anoto Functionality—Freedom of expression, Sep. 26, 2002.
Internet printout—http:/www.functionality.com: Anoto Functionality—You to yourself, Sep. 26, 2002.
Internet printout—http:/www.functionality.com: Anoto Functionality—You to someone else, Sep. 26, 2002.
Internet printout—http:/www.functionality.com: Anoto Functionality—You to an organization, Sep. 26, 2002.
Internet printout—http:/www.functionality.com: Anoto Functionality—Hints & tips, Sep. 5, 2003.
Internet printout—http:/www.functionality.com: Anoto Functionality—Hints & tips Using your digital pen, Sep. 5, 2003.
Internet printout—http:/www.functionality.com: Anoto Functionality—Hints & tips Using your digital paper, Sep. 5, 2003.
Internet printout—http:/www.functionality.com: Anoto Functionality— Digital paper, Sep. 26, 2002.
Internet printout—http:/www.functionality.com: Anoto Functionality— Digital service, Sep. 26, 2002.
Internet printout—http:/www.functionality.com: Anoto Functionality—Hints & tips Using your digital service, Sep. 5, 2003.
Internet printout—http:/www.anotofunctionality.com: Anoto Functionality—Digital pens, Sep. 5, 2003.
Internet printout—http:/www.anotofunctionality.com: Anoto Functionality—Digital paper, Sep. 5, 2003.
Internet printout—http:/www.anotofunctionality.com: Anoto Functionality—Digital service, Sep. 5, 2003.
Internet printout—http:/www.anotofunctionality.com: Anoto Functionality—Software and additionals, Sep. 5, 2003.
Internet printout—http:/www.edgereview.com: The Edge—First Look: Digital Ink n-scribe, Sep. 5, 2003.
Internet printout—http:/www.techtvcom: Nscribe Pen and Presenter-to-Go, Sep. 5, 2003.
Internet printout—http:/www.pcmag.com: Jot This, Sep. 5, 2003.
Internet printout—http:/www.competitivetech.net: Competitive Technologies' Investee Introduces N-Scribe Pen, Sep. 5, 2003.
Internet printout—http:/www.flashcommerce.com: n-scribe For Digital Writing, Sep. 5, 2003.
Internet printout—http:/www.wired.com: The Hot New Medium: Paper, Sep. 5, 2003.
Internet printout—http:/www.gizmo.com: Maxell Digital Pen to Use Anoto system, Sep. 5, 2003.
Internet printout—http:/www.anoto.com: Pattern, Sep. 5, 2003.
Internet printout—http:/www.anoto.com: Construction, Sep. 5, 2003.
Internet printout—http:/www.anoto.com: Paper space, Sep. 5, 2003.
Internet printout—http:/www.anoto.com: Paper and Printing, Sep. 5, 2003.
Internet printout—http:/www.anoto.com: Page template, Sep. 5, 2003.
Internet printout—http:/www.anoto.com Printers supporting Anoto functionality, Sep. 5, 2003.
Internet printout—Mimio—Digital Whiteboard Recorder, undated.
Internet printout—http:/www.mimio.com: Capture, Save and Share, Sep. 5, 2003.
Internet printout—http:/www.tabletpccorner.com: Auto Pen Bluetooth, Sep. 5, 2003.
Internet printout—http:/www.wacom.com: intuos2, Sep. 5, 2003.
Internet printout—http:/www.wacom.com: Penable Wacom, Sep. 5, 2003.

Internet printout—http:/www.wacom.com: tablet PC, Sep. 5, 2003.
Internet printout—http:/www.wacom.com: Cintiq—Interactive Pen Display, Sep. 5, 2003.
Internet printout—http:/www.wacom.com: Intuos2—the Professional Tablet, Sep. 5, 2003.
Internet printout—http:/www.wacom.com: Graphire2—Have more fun with digital phones, Sep. 5, 2003.
Internet printout—http:/www.smarttech.com: What's New, Sep. 5, 2003.
Internet printout—http:/www.smarttech.com: SMART Board Interactive Whiteboard, Sep. 5, 2003.
Internet printout—http:/www.smarttech.com: SMART Board Interactive Whiteboard—Front Projection Features, Sep. 5, 2003.
Internet printout—http:/www.smarttech.com: SMART Board Interactive Whiteboard—Q&A, Sep. 5, 2003.
Internet printout—SMART Board™ Interactive Whiteboard Specifications—Model 540, undated.
Internet printout—http:/www.smarttech.com: SMART Board Interactive Whiteboard Profiles—Sep. 5, 2003.
Internet printout—http:/www.smarttech.com: SMART Board Software Features—Sep. 5, 2003.
Internet printout—http:/www.smarttech.com: Press Releases—SMART lauches Research Assistance Program—Sep. 5, 2003.
Internet printout—http:/www.smarttech.com: SMART Technologies, Inc. Press Releases, Sep. 5, 2003.
Internet printout—http:/www.smarttech.com: SMART Technologies, Inc., New annotation and software functionality on all SMART Board™ Interactive whiteboards, Sep. 5, 2003.
Internet printout—http:/www.smarttech.com: Carnegie Mellon research ranks the SMART Board™ interactive whiteboards as fastest, most accurate way to interact with projected information, Sep. 5, 2003.
Internet printout—http:/www.smarttech.com: SMART Campfire™ whiteboard camera system effortlessly saves dry-erase whiteboard notes, Sep. 5, 2003.
Internet printout—http:/www.smarttech.com: SMART Technologies, Inc., awarded another U.S. patent for touch sensitive SMART Board™ technology, Sep. 5, 2003.
Internet printout—http:/www.mimio.com: Turn your whiteboard into an interactive whiteboard, Sep. 5, 2003.
Internet printout—http:/www.mimio.com: Mimio products, Sep. 5, 2003.
Internet printout—http:/www.mimio.com: Mimio technology, Sep. 5, 2003.
Brochure: VPEN, Revolutionizing human interaction with the digital world™, OTM Technologies, undated.
Internet printout—http:/www.ammagazine.com: RF Pen Sends Your Scibbles, Sep. 26, 2002.
Fujieda et al., Developmet of Pen-shaped Scanners, NEC vol. 51 No. 10, 1998.
A. Champaneria, "PADCAM: A Real-Time, Human-Centric Notetaking System" MIT Laboratory for Computer Science, Mar. 2002.
Internet printout—http:www.is.cs.cmu.edu: Preprocessing in the Npen++ System, Aug. 8, 2002.
Internet printout—http:www.is.cs.cmu.edu:Final input representation, Aug. 8, 2002.
Internet printout—http:www.is.cs.cmu.edu: Npen++, Aug. 8, 2002.

J.L. Crowley et al., "Things That See", Communications of the ACM, vol. 43, No. 3, Mar. 2000.
B. Ko et al., "Finger Mouse and Gesture Recognition System as a New Human Computer Interface" Comput. & Graphics, vol. 21, No. 5, pp. 555-561, 1997.
Okada et al., "A High-Resolution Handwriting Character Input Device Using Laser Beams", 1981.
Sato et al., Video Tablet—2D Corrdinate Input Device with OCD Camera, vol. J67-D No. 6.
Kai-Fu Lee, "Automatic Spech Recognition—The Development of the SPINX System", Kluwer Academic Publishers, pp. 1-207, 1992.
Frederick Jelinek, "Statiscal Methods for Speech Recognition", The MIT Press, pp. 1-283, 2001.
Fujieda et al., "*Development of Pen-Shaped Scanners*", Nec, vol. 51, No. 10, 1998.
Crowley et al., "*Things That See*", Communications of the A.C.M., vol. 43, No. 3, pp. 54-64, Mar. 2000.
Sato et al., "*Video Tablet—2D Coordinate Input Device With OCD Camera*", Osaka University, vol. J67-D, No. 6, Jun. 1984.
Okada et al., "*A High-Resolution Handwiting Character Input Device Using Laser Beams*", Department of Instrumentation Engineering, Faculty of Science and Technology, vol. 10.4, No. 11.1, 1981.
Ko et al., "*Finger Mouse and Gesture Recognition System As a new Human computer Interface*", Computer and Graphics, Col. 21, No. 5, pp. 555-561, 1997.
Champaneria, "*PADCAM: A Real-Time, Human-Centric Notetaking System*", MIT Laboratory for Computer Science, Mar. 2002.
OTM Technologies, "*VPEN—Revolutionizing Human Interaction With the Digital World™*", pp. 1-6.
Internet Print Out: "*N-Scribe For Digital Writing*", Mobileinfo.com, News issue #2001—15 (Apr. 2001), http://www.mobileinfo.com/News 2001/Issue15/Digital-nscribe.htm, dated Jul. 15, 2002.
Internet Print Out: "*Don't Break This Pen*", Edgereview.com, by Brian Urbanski http://www.edgereview.com/ataglance.cfm?category=edge&ID=180, dated Jul. 15, 2002.
Internet Print Out: "*DataGlyphs®, Embedding Digital Data*", Parc Solutions, http://www.parc.com/solutions/dataglyphs/, dated Jul. 15, 2002.
Internet Print Out: "*Navilite—Optical Opportunities—Bluetooth-enabled optical transition measurement technology paves the way for an untethered stylus that can write on any surface*", vol. 8, Issue No. 34, Jul. 5-11, 2002, www.computerworld.com, dated Aug. 15, 2002.
Internet Print Out: "*Competitive Technologies' Investee Introduces N-Scribe Pen—Digital Ink Presents Wireless Pen at Demo 2001*", Competitive Technologies, http://www.competitivetech, dated Sep. 5, 2003.
Internet Print Out: "*N-Scibe For Digital Writing*", Flash Commerce News, http://www.flashcommerce.com/articles/, dated Sep. 5, 2003.
Internet Print Out: "*The Hot New Medium Paper—How The Oldest Interface In The Book Is Redrawing The Map Of The Networked World*", http://www.wired.com/wired/, dated Sep. 5, 2003.
Internet Print Out: "*Maxwell Digital Pen To Use Anoto System*", Gizmo, http://www.gismo.com/au/, dated Sep. 5, 2003.
Internet Print Out: "*Anoto Pen Bluetooth*", Tabletpccorner, http://www.tabletpccorner.net, dated Sep. 5, 2003.

Internet Print Out: "*Jot This—Nscribe Pen*", Magazine, http://www.pcmag.com/article2/0,4149,31650,00.asp, dated Jul. 15, 2002.

Internet Print Out: "*Jot This—Nscribe Pen*", Magazine, http://www.pcmag.com/article2/0,4149,31650,00.asp, dated Sep. 5, 2003.

Internet Print Out: "*RF Pen Send Your Scribbles*", Appliance Manufacturing Magazine, http://www.ammagazine.com, dated Sep. 26, 2002.

Internet Print Out: " Nscribe pen And Presenter-To-Go—Infrared Pen And New Springboard Module Make Their Debut At Demo 2001 ", Edgereview.com by Brian Urbanski, http://www.techtv.com.freshgear/pr, dated Sep. 5, 2003.

Internet Print Out: "*Don't Break This Ink Pen*", Edgereview.com, by Brian Urbanski, http://www.edgereview.com/ataglance.cfm?category=edge&ID=180, dated Sep. 5, 2003.

Internet Print Out: "*Preprocessing In the NPen++ System*", http://www.is.cs.cmu.edu/mie/multimodal npen preproc.html, dated Aug. 8, 2002.

Internet Print Out: "*OTM Technologies—V Pen*", searched http://www.otmtech.com/vpen3.asp, pp. 1-7.

Internet Print Out: "*Mimio—Products*", Mimio, http://www.mimio.com, pp. 1-8.

Internet Print Out: "*SMART Board Interactive Whiteboard*", Smarttech, http://www.smarttech.com, pp. 1-26.

Haynes, "*Wacom PL-500*", www.wacom.co.uk.

Internet Print Out: "*(Electro-Magnetic Resonance) send and position sensing technology*", Wacom, Technology, http://www.wacom-components.com/tech.asp, pp. 1-6.

Internet Print Out: "*Cordless Batteryless Pen*", Wacom Penabled Components, http://www.wacom.com/components/index.cfm, dated Jul. 15, 2002.

Internet Print Out: "*PL-500—15.1 inch Screen Digital LCD Pen Tablet System*", Wacom Graphics Tablet Solution, http://ap.wacm.co.ip/products/pl/contents/pl500.html, pp. 1-13.

Internet Print Out: Digital Pens, http://www.anotofunctionality.com/navigate.asp?PageID=96, pp. 1-70.

European Search Report, Application No.: 03021238.5-1527; Dated Jun. 1, 2005, Total pages (6).

Dey, et al., "A Fast Algorithm for Computing the Euter Number of an image and its VLSI Implementation", IEEE; 13th International Conference on VLSI Design (Jan. 2003).

European Search Report for Application No. EP 03 02 1235, dated Jun. 1, 2005.

* cited by examiner

UNIVERSAL COMPUTING DEVICE

RELATED APPLICATIONS

This application is related to U.S. Ser. No. 10/284,412, entitled "Active Embedded Interaction Code," invented by Jian Wang, Qiang Wang, Chunhui Zhang, and Yue Li, and to U.S. Ser. No. 10/284,451, entitled "Passive Embedded Interaction Code," invented by Jian Wang, Yingnong Dang, Jiang Wu and Xiaoxu Ma, whose contents are hereby incorporated by reference.

BACKGROUND

1. Technical Field

This disclosure relates to a computer input device for generating smooth electronic ink. More particularly, the disclosure relates to an input device may be used on divergent platforms, while providing a common user interface.

2. Related Art

Computing systems have dramatically changed the way in which we live. The first wave of computers was prohibitively expensive, and was only cost effective for use in business settings. As computers became more affordable, the use of personal computers both in the workplace and at home have become so widespread that computers have become as common as desks in the office and kitchen tables in the home. Microprocessors have been incorporated in all aspects of our daily lives, from use in television and other entertainment systems to devices for regulating the operation of our automobile.

The evolution of computing devices, from data crunching devices that occupied entire floors of large office facilities, to laptop computers or other portable computing devices, has dramatically impacted the manner in which documents are generated and information stored. Such portable computing have enabled individuals to type letters, draft memorandum, take notes, create images, and perform numerous tasks in places other than the office using these computing devices. Professionals and nonprofessionals alike are empowered to take perform tasks while on the move using devices that fulfill their computing needs in any location.

Typical computer systems, especially computer systems using graphical user interface (GUI) systems, such as Microsoft Windows, are optimized for accepting user input from one or more discrete input devices such as a keyboard (for entering text), and a pointing device (such as a mouse) with one or more buttons for activating user selections.

One of the original goals of the computing world was to have a computer on every desk. To a large extent, this goal has been realized by the personal computer becoming ubiquitous in the office workspace. With the advent of notebook computers and high-capacity personal data assistants, the office workspace has been expanded to include a variety of non-traditional venues in which work is accomplished. To an increasing degree, computer users must become masters of the divergent user interfaces for each of their computing devices. From a mouse and keyboard interface for the standard personal computer to the simplified resistive stylus interface of personal data assistants and even to the minimalistic keys of a cellular telephone, a user is confronted with a variety of different user interfaces that one needs to master before he can use the underlying technology.

Despite the advances in technology, most users tend to use documents printed on paper as their primary editing tool. Some advantages of printed paper include its readability and portability. Others include the ability to share annotated paper documents and the ease at which one can archive printed paper. One user interface that is bridging the gap between advanced computing systems and the functionality of printed paper is a stylus-based user interface. One approach for the stylus-based user interface is to use resistive technology (common in today's PDAs). Another approach is to use active sensors in a notebook computer. One of the next goals of the computing world is to bring the user interface for operating the computer back to the user.

A drawback associated with the use of a stylus is that such devices are tied to the computing device containing the sensor board. In other words, the stylus may only be used to generate inputs when used in conjunction with the required sensor board. Moreover, detection of a stylus is affected by the proximity of the stylus to the sensing board.

There is a need in the art for a portable computing device that may function as an input device for any one of a variety of computing devices and which may operate in a variety of situations.

SUMMARY

Aspects of the present invention address one or more of the issues identified above, thereby providing a common user interface to users across divergent computing platforms. Aspects of the present invention relate to an input device for generating electronic ink, and/or generating other inputs, independent of the device for which the data is intended. The input device may be formed in the shape of a pen, and may or may not include an ink cartridge to facilitate movement of the input device in a familiar manner.

The foregoing summary of aspects of the invention, as well as the following detailed description of various embodiments, is better understood when read in conjunction with the accompanying drawings, which are included by way of example, and not by way of limitation with regard to the claimed invention.

DETAILED DESCRIPTION OF THE DRAWINGS

Aspects of the present invention relate to an input device that may be used in a variety of different computing platforms from controlling a desktop or notebook computer, writing on a whiteboard, controlling a PDA or cellular phone, or creating ink that may be ported to any of these platforms. The following description is divided into a number of sections as follows: terms, general-purpose operating environment, universal pen and camera, active coding, passive coding, internal sensors, additional components, sample implementations.

Terms

Pen—any writing implement that may or may not include the ability to store ink. In some examples a stylus with no ink capability may be used as a pen in accordance with embodiments of the present invention.

Camera—an image capture system.

Active Coding—incorporation of codes within the object or surface over which the input device is positioned for the purpose of determining positioning and/or movement of the input device using appropriate processing algorithms.

Passive Coding—detecting movement/positioning of the input device using image data, other than codes incorporated for that purpose, obtained from the object or surfaces over which the input device is moved using appropriate processing algorithms.

Input Device—a device for entering information which may be configured for generating and processing information Active Input Device—an input device that actively measures signals and generates data indicative of positioning and/or movement of the input device using sensors incorporated within the input device.

Passive Input Device—an input device for which movement is detected using sensors incorporated other than within the input device.

Computing Device—a desktop computer, a laptop computer, Tablet PC™, a personal data assistant, a telephone, or any device which is configured to process information including an input device.

General Purpose Operating Environment

Figure 1:
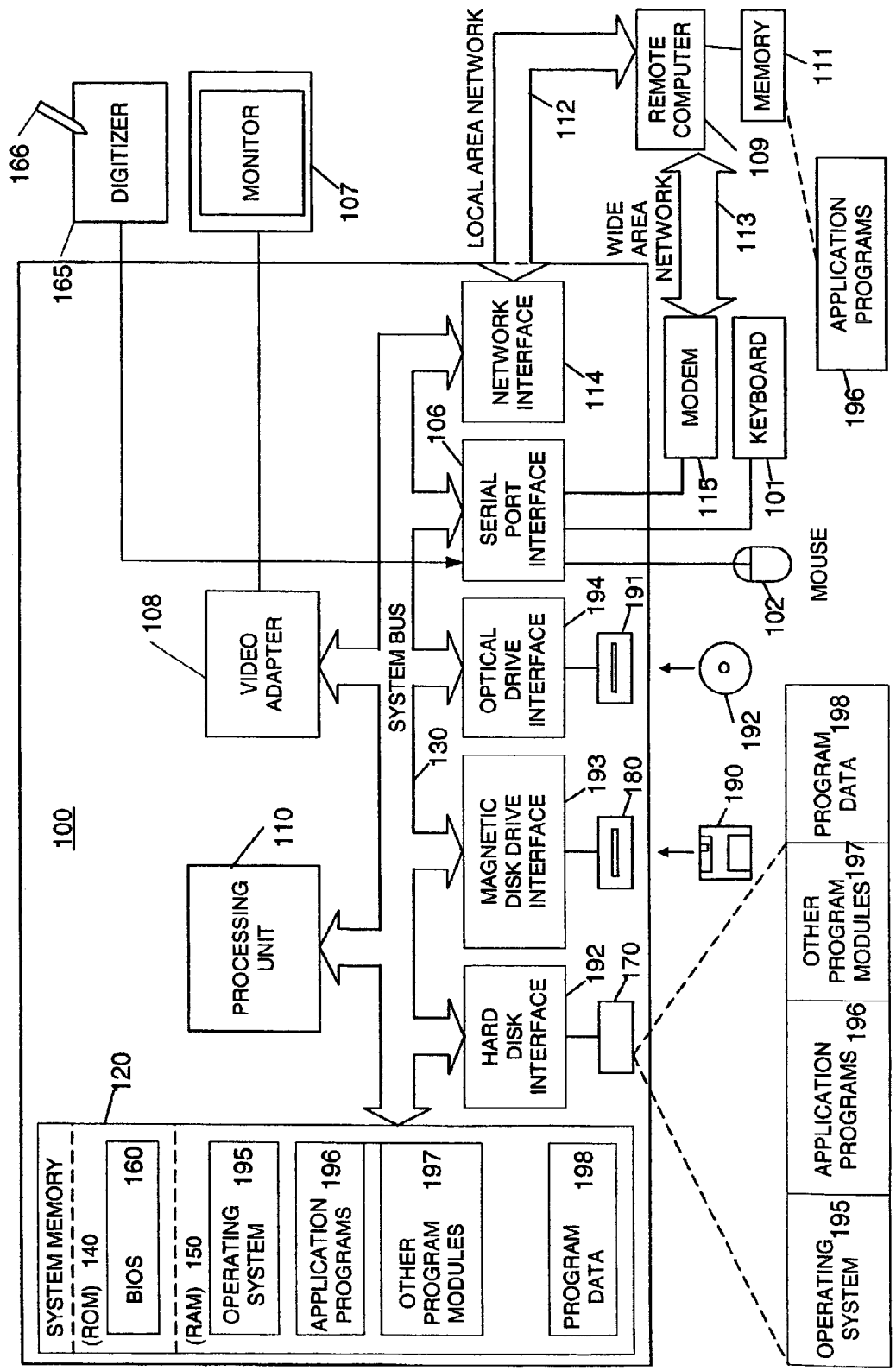
FIG. 1 shows a general description of a computer that may be used in conjunction with embodiments of the present invention.

FIG. 1 is a functional block diagram of an example of a general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Universal Pen and Camera

Figure 2:
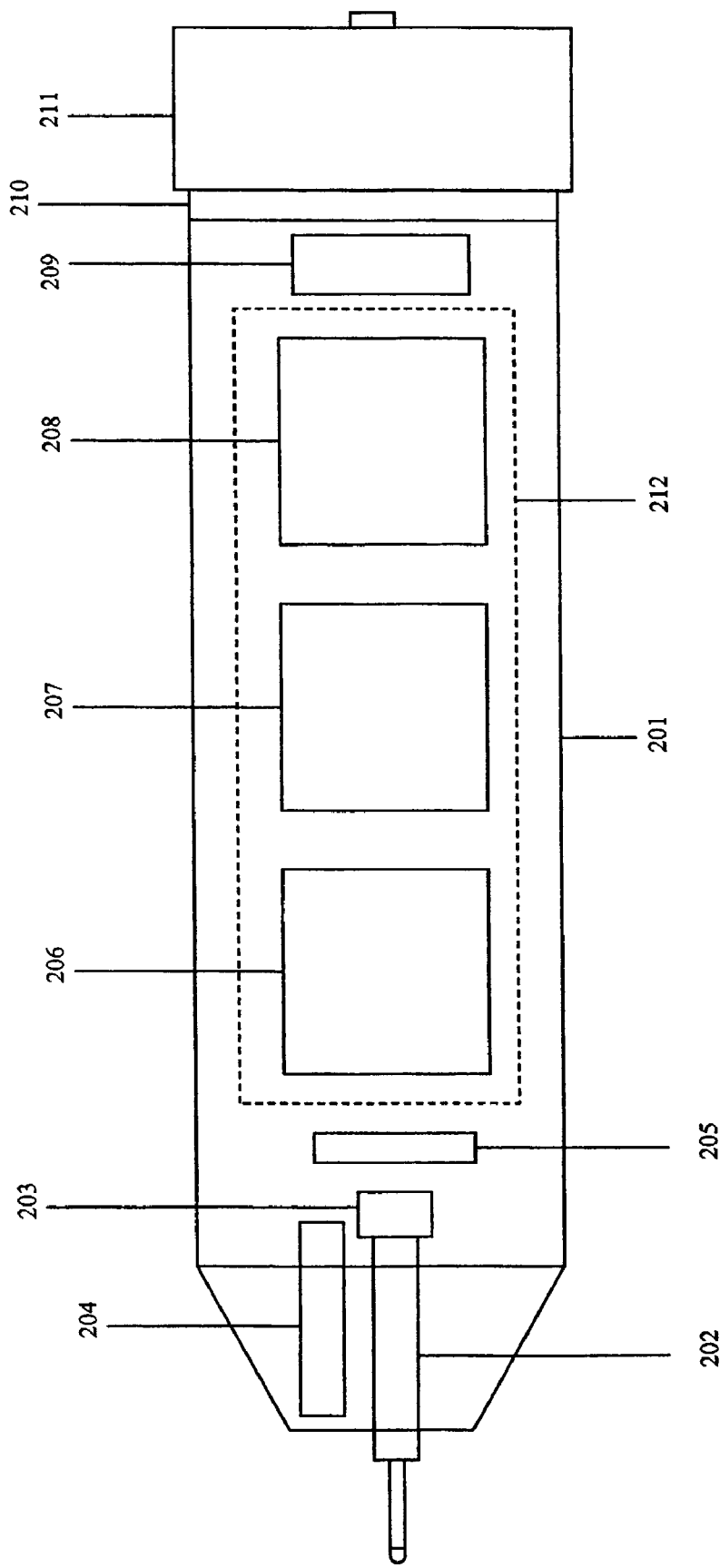
FIG. 2 illustrates an input device (including all of the components) in accordance with an illustrative embodiment of the present invention.

FIG. 2 provides an illustrative embodiment of an input device for use in accordance with various aspects of the invention. The following describes a number of different elements and/or sensors. Various sensor combinations may be used to practice aspects of the present invention. Further, additional sensors may be included as well, including a magnetic sensor, an accelerometer, a gyroscope, a microphone, or any sensor for that might detect the position of the input device relative to a surface or object. In FIG. 2, pen 201 includes ink cartridge 202, pressure sensor 203, camera 204, inductive element 205, processor 206, memory 207, transceiver 208, power supply 209, docking station 210, cap 211, and display 212. The various components may be electrically coupled as necessary using, for example, a bus, not shown. Pen 201 may serve as an input device for a range of devices including a desktop computer, a laptop computer, Tablet PC™, a personal data assistant, a telephone, or any device which may process and/or display information.

The input device 201 may include an ink cartridge 202 for performing standard pen and paper writing or drawing. Moreover, the user can generate electronic ink with the input device while operating the device in the manner typical of a pen. Thus, the ink cartridge 202 may provide a comfortable, familiar medium for generating handwritten strokes on paper while movement of the pen is recorded and used to generate electronic ink. Ink cartridge 202 may be moved into a writing position from a withdrawn position using any of a number of known techniques. Alternatively, ink cartridge 202 may be replaced with a cartridge that does not contain ink, such as a plastic cartridge with a rounded tip, but that will allow the user to move the pen about a surface without damaging the pen or the surface. Additionally, an inductive element or elements may be included to aid in detecting relative movement of the input device by, for example, providing signals indicative of the input device in a manner similar to those generated by a stylus. Pressure sensor 203 may be included for designating an input, such as might be indicated when the pen 201 is depressed while positioned over an object, thereby facilitating the selection of an object or indication as might be achieved by selecting the input of a mouse button, for example. Alternatively, the pressure sensor 203 may detect the depressive force with which the user makes strokes with the pen for use in varying the width of the electronic ink generated. Further, sensor 203 may trigger operation of the camera. In alternative modes, camera 204 may operate independent of the setting of pressure sensor 203.

Moreover, in addition to the pressure sensor which may act as a switch, additional switches may also be included to effect various settings for controlling operation of the input device. For example, one or more switches, may be provided on the outside of the input device and used to power on the input device, to activate the camera or light source, to control the sensitivity of the sensor or the brightness of the light source, set the input device in a sketch mode in which conversion to text is not performed, to set the device to store the input data internally, to process and store the input data, to transmit the data to the an processing unit such as a computing device with which the input device is capable of communicating, or to control any setting that might be desired.

Camera 204 may be included to capture images of the surface over which the pen is moved. Inductive element 205 also may be included to enhance performance of the pen when used as a stylus in an inductive system. Processor 206 may be comprised of any known processor for performing functions associated with various aspects of the invention, as will described in more detail to follow. Similarly, memory 207 may include a RAM, a ROM, or any memory device for storing data and/or software for controlling the device or processing data. The input device may further include a transceiver 208. The transceiver permits information exchange with other devices. For example, Bluetooth or other wireless technologies may be used to facilitate communications. The other devices may include a computing device which may further includes input devices.

Power supply 209 may be included, and may provide power if the pen 201 is to be used independent of and remotely from the host device, the device in which the data is to be processed, stored and/or displayed. The power supply 209 may be incorporated into the input device 201 in any number of locations, and may be positioned for immediate replacement, should the power supply be replaceable, or to facilitate its recharging should the power supply be rechargeable. Alternatively, the pen may be coupled to alternate power supplies, such as an adapter for electrically coupling the pen 201 to a car battery, a recharger connected to a wall outlet, to the power supply of a computer, or to any other power supply.

Docking station link 212 may be used to transfer information between the input device and a second device, such as an external host computer. The docking station link may also include structure for recharging the power supply 206 when attached to a docking station, not shown, or connected to a power supply. A USB or other connection may removably connect the input device to a host computer through the docking station link, or through an alternative port. Alternatively, a hardwire connection may also be used to connect the pen to a device for transferring and receiving data. In a hardwired configuration, the docking station link would be omitted in favor of wiring connecting the input device directly to a host. The docking station link may be omitted or replaced with another system for communicating with another device (Bluetooth 802.116, for example).

The input device 201 may further include a removable cap 211 which may be equipped with a metal tip for facilitating resistive sensing, so that input device 201 may be used with a device that includes a sensing board, for example. The shell of input device 201 may be comprised of plastic, metal, a resin, a combination thereof, or any material that may provide protection to the components or the overall structure of the input device. The chassis may include a metal compartment for electrically shielding some or all of the sensitive electronic components of the device. The input device may be of an elongated shape, which may correspond to the shape of a pen. The device may, however, be formed in any number of shapes consistent with its use as an input device and/or ink generating device.

Figure 3A:
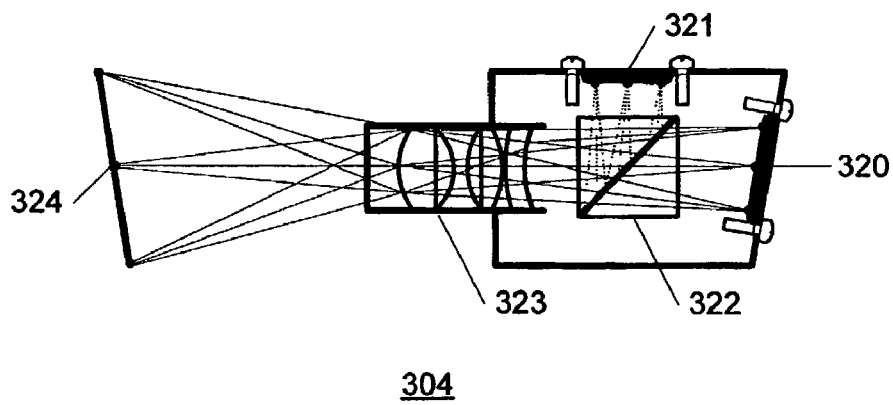
FIG. 3 provides three illustrative embodiments of a camera system for use in accordance with aspects of the present invention.
Figure 3B:
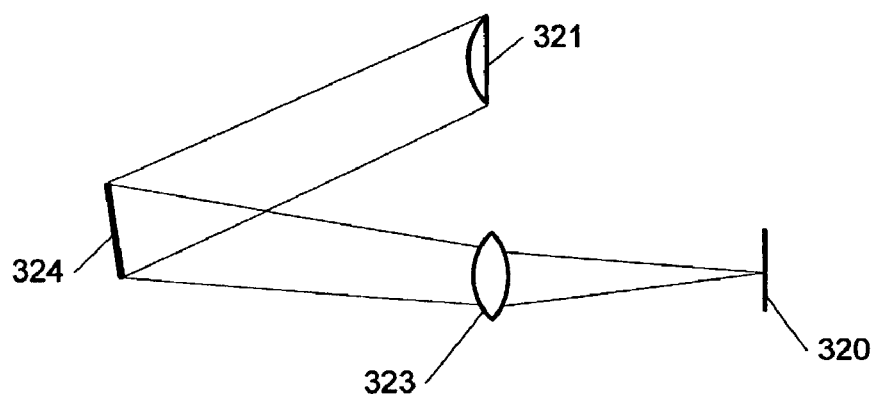
Figure 3C:
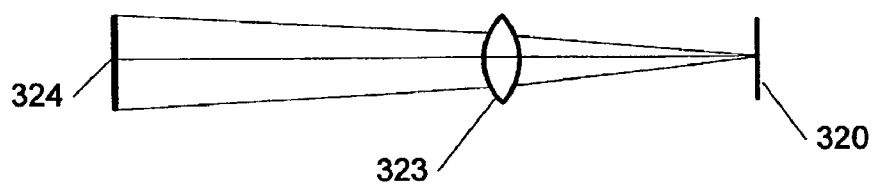

FIGS. 3A–C depict three illustrative embodiments of a camera for use in accordance with aspects of the present invention. As described, the input device 201 may be used to generate electronic ink by detecting movement of the pen using, for example, a camera. Camera 321 may be included to capture images of the surface over which the pen is moved, and through image analysis, detect the amount of movement of the pen over the surface being scanned. The movements may be correlated with the document and electronically transpose, add, or associate (e.g. store input annotations apart from the original document) electronic ink to the document).

As shown in FIG. 3A, in one embodiment, camera 304 includes an image sensor 320 comprised of, for example, an array of image sensing elements. For example, the camera may be comprised of a CMOS image sensor with the capability of scanning a 1.79 mm by 1.79 mm square area at a resolution of 32 pixels by 32 pixels. The minimum exposure frame rate for one such image sensor may be approximately 330 Hz, while the illustrative image sensor may operate at a processing rate of 110 Hz. The image sensor selected may comprise a color image sensor, a grayscale image sensor, or may operate to detect intensities exceeding a single threshold. However, selection of the camera or its component parts may vary based on the desired operating parameters associated with the camera, based on such considerations as performance, costs or other considerations, as may be dictated by such factors as the resolution required to accurately calculate the location of the input device.

A light source, 321, may illuminate the surface over which the input device is moved. The light source may, for example, be comprised of a single light emitting diode (LED), an LED array, or other light emitting devices. The light source may produce light of a single color, including white, or may produce multiple colors. A half mirror 322 may be included within the camera to direct light as desired. The camera 304 may further include one or more optical devices 323 for focusing light from the light source 321 onto the surface scanned 324 and/or to focus the light reflected from that surface to the image sensor 320.

As illustrated in FIG. 3A, light emitted from light source 321 is reflected by half-mirror 322, a mirror that reflects or transmits light depending on direction of the impinging light. The reflected light is then directed through lens system 323 and transmitted to the reflective surface below. The light is then reflected off of that surface, through lens system 323, strikes half-mirror 322 at a transmission angle passing through the mirror, and impinges on sensing array 320. Of course, cameras including a wide range of components may be used to capture the image data, including cameras incorporating a lesser, or a greater, number of components. Variations in the arrangement of components may also be numerous. To provide just one example, in simplified arrangement, the light source and the sensing array may be positioned together such that they both face the surface from which the image is to be captured. In that case, because no reflections within the camera are required, the half-mirror may be removed from the system. As shown in FIG. 3B, in a simplified configuration the light source 321 is positioned a distance from the lens 323 and sensor 320. In further simplified arrangement, as shown in FIG. 3C, the light source may be removed and ambient light reflecting off the object surface is focused by lens 323 onto the sensor 320.

Thus, variations in the components incorporated into the camera, or their placement, may be employed in a manner consist with aspects of the present invention. For example, the placement and/or orientation of the camera and/or cartridge may be varied from that shown in FIG. 2 to allow for the use of a wide range of camera and/or ink configurations and orientations. For example, camera 304, or any of its component parts, may be located in openings adjacent that provided for the ink cartridge, rather than within the same opening as illustrated. As an additional example, camera 304 may be positioned in the center of the input device with the ink cartridge positioned to the side of the camera. Similarly, the light source 321 may be incorporated within the structure housing the remaining components of the camera, or one or more components may be positioned separate from the others. Furthermore, a light projecting feature may also be enabled, using a light source and/or optical system, with additional structure and/or software, or modifications to the illustrated components as necessary.

Active Coding

To aid in the detection and/or positioning of the input device, the surface of an object over which the input device is positioned may include image data that indicates the relative position of areas of the surface. In one exemplarily embodiment, the surface being scanned may comprise the display of a host computer or other external computing device, which may correspond to the monitor of a desktop computer, a laptop computer, Tablet PC™, a personal data assistant, a telephone, digital camera, or any device which may display information. Accordingly, a blank document or other image generated on the screen of a Tablet PC™ may include data corresponding to a code that represents the relative position of that portion of the document within the entire document, or relative to any other portion of the image. The information may be comprised of images, which may include alphanumeric characters, a coding pattern, or any discernable pattern of image data that may be used to indicate relative position. The image or images selected for use in designating the location of areas within the surface of the object may depend on the sensitivities of the scanning device incorporated into the camera, such as the pixel resolution of the sensor, and/or the pixel resolution of the image data contained within the surface being scanned. The location information extracted from the object may then be used to track movement of the input device over the object. Using that information, electronic ink or other information corresponding to movement of the input device may be accurately generated. Location information may be used to both detect the position within the image at which the input is to be effected, as well as to provide an indication of movement of the input device over the object surface. The resulting information may be used interactively with word processing software to generate changes in a document, for example.

In an alternate embodiment, the object used in combination with the input device may be composed of paper with positional information included in the background, for example. The positional information may be incorporated in any form of code, optical representation, or other form that may be sensed by a sensor associated with the input device and used to represent the relative location of the specific site on the paper.

Figure 4:
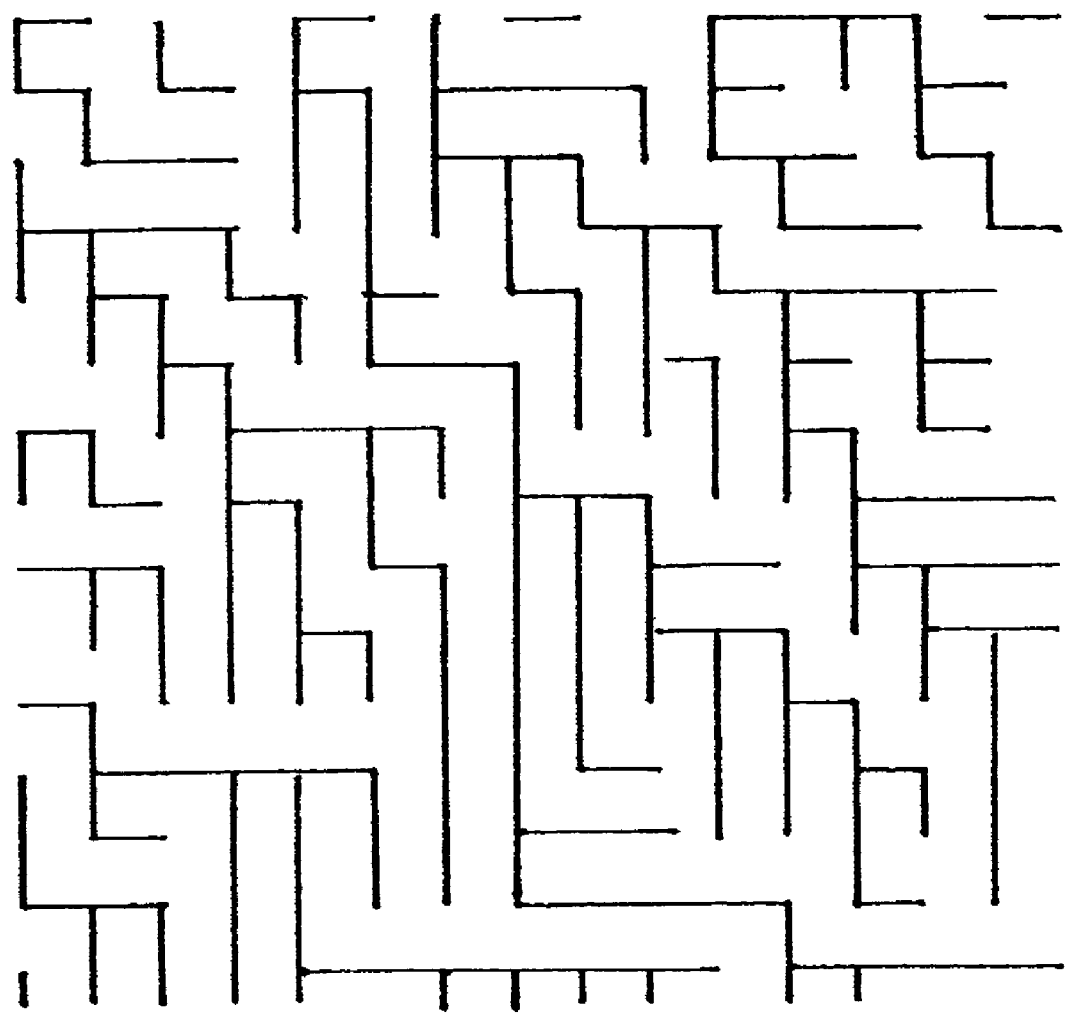
FIG. 4 illustrates an illustrative technique (maze pattern) for encoding the location of the document.

FIG. 4 illustrates an illustrative technique for encoding the location of the document. In this example, the background of the image may include thin lines that, when viewed in large groups form a maze-like pattern. Each grouping of lines within the maze design, comprised of a few thin lines with unique orientations and relative positions, for example, may indicate the position of that portion of the maze pattern relative to other portions of the document. Decoding of the maze pattern found in a captured image may be performed in accordance with numerous decoding schemes. In one embodiment, a particular arrangement and grouping of lines may be decoded to generate positional information. In another embodiment, an indication of the position of the captured data may be derived by extracting a code from the image corresponding to the sampled pattern, and using that code to address a look-up table containing data identifying the location of that area. Reference to the coding technique employing a maze pattern is provided for illustrative purposes, and alternative active coding techniques, including, but not limited to the visual coding techniques in U.S. Ser. No. 10/284,412, entitled, "Active Embedded Interaction Code" invented by Jian Wang, Qiang Wang, Chunhui Zhang, and Yue Li, whose contents are expressly incorporated by reference for all essential subject matter, may also be used consistent with aspects of the invention.

Passive Coding

Even in the absence of location codes, images captured by the image sensor may be analyzed to determine the location of the input device at the time of image capture. Successive images may be used to calculate the relative positions of the input device at different times. Correlation of this information may yield an accurate trace of the input device over the substrate. Using this trace information electronic ink accurately representing handwritten strokes may be generated, for example.

Figure 5:
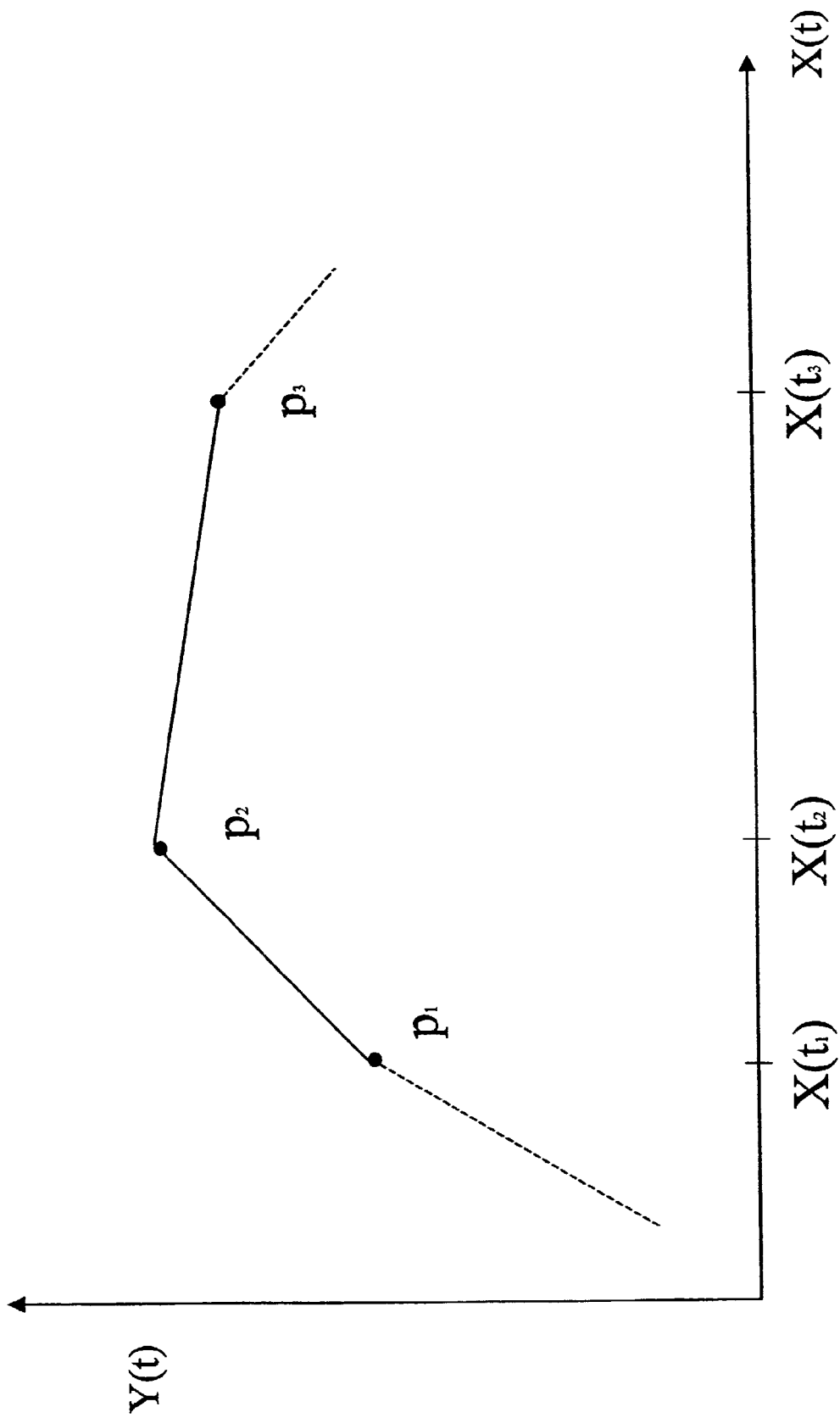
FIG. 5 provides an illustration of a trace pattern from which electronic ink may be generated.

FIG. 5 provides an illustration of a trace pattern from which electronic ink may be generated. In this example, a first captured image may contain a portion of a maze pattern indicative of a first position $p_1$ of the input device at a first time, $t_1$. The next captured image may contain a portion of the coded image data, a different portion of the maze pattern in this example, providing location information of a second position $p_2$ at a second time, $t_2$. A third captured image may contain a third portion of the maze pattern, thereby indicating positioning of the input device at a third position $p_3$ at time $t_3$. Using this data, the three points may indicate a trace of the input device from time $t_1$ through $t_3$. Applying algorithms for estimating the inking pattern traced by the input device, electronic ink may be generated. The complexity of the algorithm applied may dictate the accuracy of the ink generated. For example, a basic inking algorithm may simply connect the dots with straight lines of unvarying thickness. Algorithms factoring previous sampling points, the time between samplings or other data indicative of the velocity or acceleration at which the input was moved, data indicative of the depressive force used, or any other relevant data, may be processed to provide ink that more accurately represents the actual movement of the input device (for example, from other sensors).

Optical scanning performed by camera 304 may generate data necessary to determine the position of the input device at various times and that information may be used to generate electronic ink. In one illustrative embodiment, comparisons of the image captured at time $t_1$ with that of the image captured at time $t_2$ may provide data indicating the distance of movement of the pen from one point to another during the period $t_1$ to $t_2$. Those two points of data, and/or the relative distance moved, may then be used to generate a trace of the movement of the input device for generating electronic ink representative of handwritten strokes. Comparisons of two or multiple images, or portions of captured images, for calculating the relative movement, might be accomplished by a difference analysis. In that case, features appearing in more than one image may be compared and the relative movement of the feature or features from one location to another within those images may provide an accurate indication of pen movement, for example. Should an irregular sampling period be used, the processing algorithm may be modified to compensate for variations in the sampling period to more accurately indicate the correlation between movement of the input device with the actual time required for each movement. Information indicative of the velocity of motion may assist in generating ink of the appropriate thickness.

In accordance with such an embodiment, the surface over which the input device is moved may include the display of a computing device, a mouse pad, a desktop, or any non-uniform reflective surface from which objects or image data may be extracted indicating movement of the input device over that surface. The tracking algorithm with which the captured image data may be processed may be fixed or may vary dependent on the characteristics of the images captured. Using a simple tracking algorithm, the processor may detect grains in the wood of a desktop, for example, and based on a comparison of a sequence of images captured by the camera, the relative location of particular patterns of grain within successive images may be used to determine the location of the input at various times and/or the relative movement of the input device over that surface. A more complex tracking algorithm may be required where features within the images are less easily discerned and the image more uniform. Alternative passive coding techniques, including, but not limited to, the coding techniques found in U.S. Ser. No. 10/284,451, entitled, "Passive Embedded Interaction Code," invented by Jian Wang, Yingnong Dang, Jiang Wu and xiaoxu Ma, whose contents are expressly incorporated by reference for all essential subject matter, may also be employed consist with aspects of the invention.

Hardware Architecture

Figure 6:
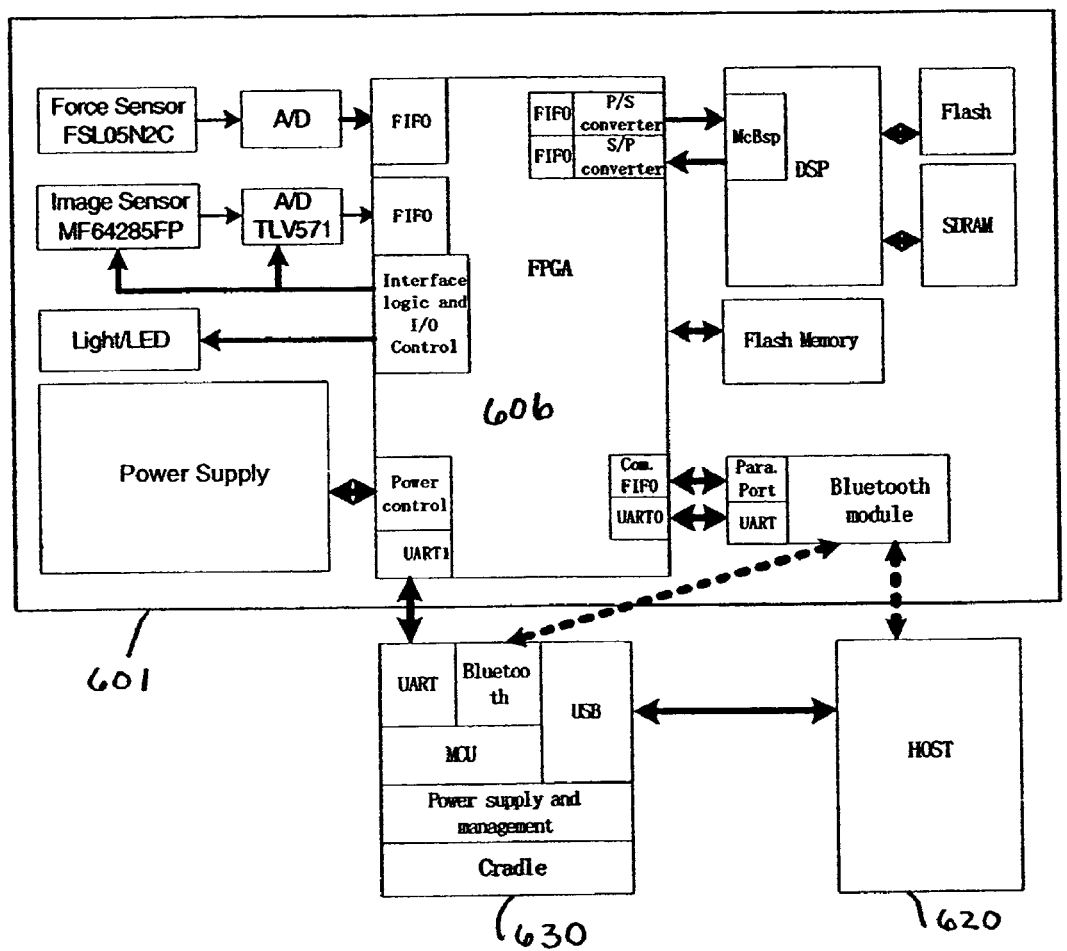
FIG. 6 shows the hardware architecture of a system in accordance with one embodiment of the present invention.

FIG. 6 shows the hardware architecture of a system in accordance with one embodiment of the present invention. Many of the same or related components illustrated in previous embodiments will be represented using like reference numerals. Processor 606 may be comprised of any known processor for performing functions associated with various aspects of the invention. For example, the processor may include an FPSLIC AT94S40, and may be comprised of an FPGA with an AVR core. That particular device may include a 20 MHz clock and operate at a speed of 20 MIPS. Of course, selection of a processor for use in input device 601 may be dictated by the cost and/or processing speed requirements of the system. The processor 606 may perform image analysis, should such analysis be conducted within the input device. Alternatively, processing may be performed by a second processor, such as a digital signal processor (DSP) incorporated into the device 601. The processor 606 may further operate to perform steps critical to reducing power consumption to conserve power stored in power supply 609, such as powering down various components when the input device is inactive, which may be based on data indicating movement and/or positioning of the device. The processor 606 may further operate to calibrate and regulate the performance of various components, including adjustments to the intensity of light source or to the sensitivity of the sensing array of camera 604, for example. Also, the processor, or a coupled digital signal processor, may choose from among a plurality of stored image processing algorithms, and may be controlled to select the image analysis algorithm most suitable for detecting movement, in accordance for example, characteristics associated with the surface over which the device is moved. Thus, the algorithm may be selected automatically based on performance considerations programmed into the input device. Alternatively, the input device may be controlled, and settings established, based on user's selections input, for example, via actuations of the force sensor or based on handwritten strokes corresponding to commands.

In one embodiment, Memory 607 may include one or more RAMs, ROMs, FLASH memories, or any memory device or devices for storing data, storing software for controlling the device, or for storing software from processing data. As noted, data representing location information may be processed within the input device 601 and stored in memory 607 for transfer to a host computer 620. Alternatively, the captured image data may be buffered in memory 607 within the input device 601 for transfer to a host device 620 for processing or otherwise.

Transceiver, or communication unit, 608 may include a transmission unit and receiving unit. As noted, information representing movement of the input device, either processed into a form suitable for generating and/or displaying electronic ink or otherwise, may be transmitted to a host computer 620, such as the previously described desktop computer, lap top computer, Tablet PC™, personal digital assistant, telephone, or other such device for which user inputs and electronic ink might be useful. The transceiver 608 may communicate with an external device using any wireless communication technique, including blue tooth technology, for performing short-range wireless communications, infrared communications, or even cellular or other long range wireless technologies. Alternatively, the transceiver 608 may control the transmission of data over a direct link to a host computer, such as over a USB connection, or indirectly through a connection with docking cradle 630. The input device may also be hardwired to a particular host computer using a dedicated connection. The transceiver 608 may also be used to receive information and/or software, which in one embodiment, may be used for improving performance of the input device. For example, program information for updating the control functions of the processor or processor may be uploaded via any of the previously described techniques. Moreover, software may also be transmitted to the input device, including software for analyzing the image data and/or for calibrating the input device may be downloaded from an external device.

Processor 606 may operate in accordance with an interaction model. An interaction model may be implemented in the form of software for maintaining a consistent experience in which electronic ink is generated regardless of the external device for which the unit performs the functions of an input device. The interaction model may process captured data for conversion into a form universally suitable for use on any number of host devices including a desktop computer, a laptop computer, Tablet PC™, a personal data assistant, a telephone, a whiteboard, or any device that might store, display or record data input via the input device. The processor 606 may recognize the device to which it is connected, or for which the data representing handwritten inputs are intended, and based on such recognition, select processing that converts input data into a form suitable for the specific device recognized. In that case, a conversion to a form useful for each potential recipient computing device would be contained within the input device and made available as necessary. Recognition of the intended recipient device may be attained as a result of communication between the devices, should they be connected wirelessly or directly. Alternatively, the user may enter the identity of the device or devices for which the data is intended directly into the input device. Of course, if the input device includes a display, data may be processed using a default processing algorithm suitable for use with the display and/or a multitude of other devices.

Inertial Sensors

Figure 7:
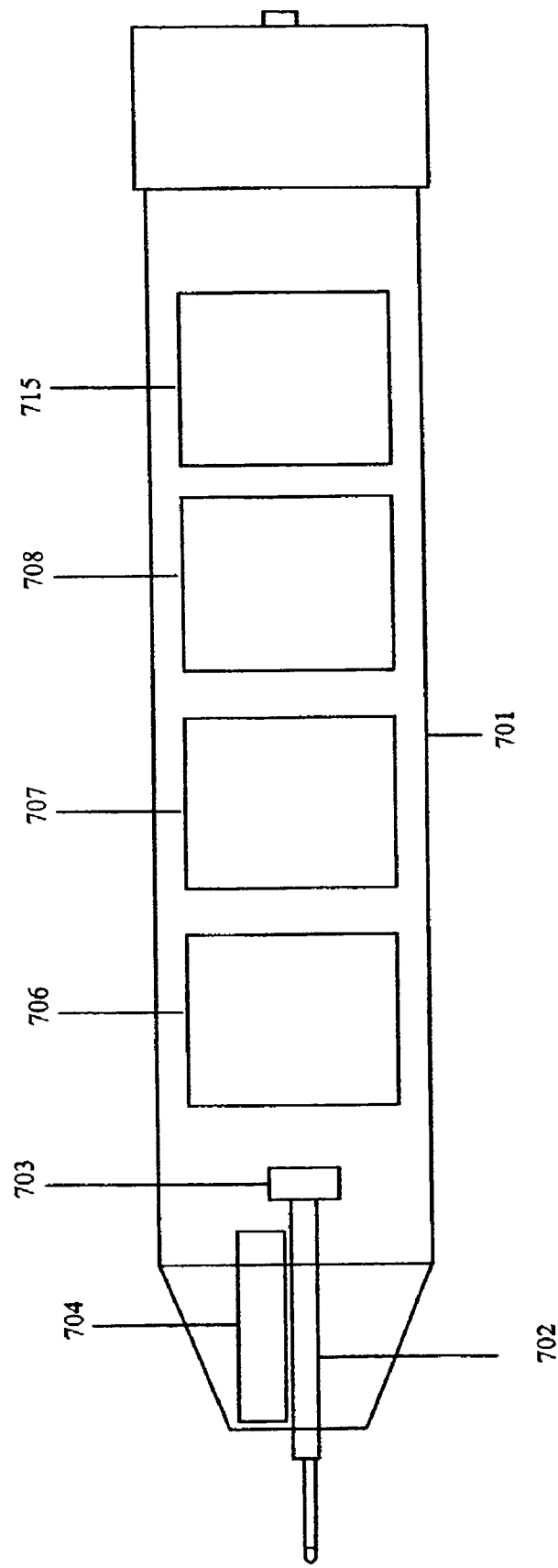
FIG. 7 illustrates a further combination of components incorporated in an input device for generating electronic ink in accordance with another illustrative embodiment.

As illustrated in FIG. 7, input device 701 also may include one or more inertial sensors 715 for sensing pen movement, position, or orientation, in addition to the previously described components represented with like reference numerals. For example, input device 701 may include a gyroscope for providing data representing the angular velocity of the pen in a plurality of directions. The input device 701 may include one or more accelerometers, or sets of accelerometers, measuring the acceleration or gravitational forces upon the pen. Data representing movement of the pen may also be obtained using a magnetic sensor which measures movements of the pen by detecting variations in measurements of the earth's magnetic field, described herein as an inertial sensor because it detects movement of the input device based on data other than image data. Data from either or any of the inertial sensors incorporated with or into the input device, which may include gyroscopes, accelerometers, magnetic sensor, inductive elements or any device or devices for measuring movement of the input device, may be used in combination with data from the camera to obtain data representing movement or positioning of the input device, and thereby produce data for generating electronic ink.

Sample Implementations

I. The Input Device May Operate Using Active Coding

A. Active Coding Provides Location Information for the Entry of Input Information on a Display or Other Writing Surface As noted, a surface of an object over which the input device is positioned and/or moved may include coded image data that indicates the location or relative position of each area within that surface. The object may comprise the display of a computing device, such as a laptop computer. In one embodiment, a document may be recalled from memory and displayed on the screen. Imbedded within that document, such as in the background, may lie coded information indicating the position of each area of the document. For example, the background of the document may include a maze pattern, a sufficiently large enough portion of that pattern uniquely identifying each region within the entire document. The input device may be used in combination with the coded location information to add annotations or edits to the document at specified locations even if the display of the laptop does not include sensors for detecting movement of an input device over a screen. Thus, the input device may function as an "active input device" such that sensors associated with the input device generate data indicative of position or location of that device.

In one example, the image sensor incorporated within the input device captures image data representing the surface of the display screen over which the input device is positioned and/or moved. The sensor captures images including location codes indicating the relative position of the input device. As the user moves about the displayed image, entering annotations and/or making edits to the electronic document displayed, the input device generates signals representing those inputs and data representing the location within the document at which those inputs are to be incorporated. Control of the laptop may be also effected using the input device, in place of a mouse, or to perform other standard inputs function including the movement of a cursor and the actuation of selections.

The input device may be used in conjunction with word processing software to edit the document by, for example, deleting text and inserting new text. To edit the document displayed on the screen of a computing device, a user positions the input device over the screen at the desired location. To delete text, the user may position the input device proximate the screen and move the device in a motion to strike through the image of the text displayed. By sensing the location codes, the image may be processed to determine both that the pen has been moved in a striking motion, and to identify the text corresponding to the location at which the user moved the input device. Accordingly, the inputs may be used to delete that data.

Next, the user may wish to insert new text. In a familiar manner, the user may draw a symbol for inserting text, such as a "carrot" or upside-down "V", at the location at which the new text is to be inserted. Processing software for converting inputs into image data and/or commands, stored in the input device or host computer, recognizes the symbol as a control signal for inserting text. With the aid of the input device, the user may then write text to be inserted by hand.

In an alternative embodiment, the user may add notes with highlighting indicating the original text to which the annotations pertain. For example, the user may select the text to be highlighted using a pull-down menu, or a highlighting button, displayed on the screen. Next, the input device is dragged over text to be selected for highlighting. Then comments to be associated with the highlighted/selected text may be written on the screen of the display at a location adjacent the highlighted text. When the operation is complete, the user may select the prompts necessary for completing entry of annotations. All of these modifications to the document may be created using the input device regardless of whether the display includes sensors for detecting movement of the input device.

Modifications to the document may be displayed and/or incorporated within the document in the form of image data, electronic ink or data converted into text. Conversion of the inputs into text may occur in a manner invisible to the user, such that text appears in the display of the document on screen as it is entered. Alternatively, the handwriting of the user may appear within the body of the document. To achieve instantaneous display of edits, information representing the movement of the pen and the location of such edits may be transmitted to the laptop device on an ongoing basis.

As noted, the identity of the person entering the inputs may also be recorded. For example, the input device may generate information identifying the user and/or the particular input device. The identity information may be attached to the generated input data. Alternatively, such identification information may be provided as a separate signal transmitted to the host device.

While the above illustrative embodiment identifies the surface over which the input device is moved as the display of a laptop device, the input device may also function to detect positioning using codes incorporated within a surface of any object over which the device may be moved. Thus, an image incorporating location codes may be created and/or editing using the input device in combination with the monitor of a desktop computer, Tablet PC™, a personal data assistant, a telephone, or any device which may display information. Coded information may also be incorporated within a transparent sheet laid over the display screen of such devices, or incorporated within a surface that may be used in combination with a display, including protective films.

Coded information may also be incorporated on a writing surface or on writing material, such as paper, to uniquely identify the locations on that surface. For example, positional information may be incorporated in the background of the paper. As noted, the positional information may include any form of indication or code representing the relative location of the specific site on the paper. Accordingly, the input device may be used in association with coded paper to record information corresponding to the handwriting of a user at the appropriate location. For example, armed with only the input device and a writing surface incorporating coded position information, while riding in a taxi, the input device may be used to draft a letter to a client. Writing on paper with the input device, gestures corresponding to text or other input information are recognized by detecting changes in the location of the input device at certain times. The inputs may then be converted into electronic ink or other electronic data for use in generating information corresponding to those gestures. Conversion of the inputs may be performed as those inputs are generated, either within the input device or if received by a host computing device coupled to the input device. Alternatively, such conversion may be performed at a later time. For example, the information generated using the input device may be stored in memory and transmitted to a recipient and/or host computer for suitable processing at later time.

Data generated using the input device, whether those inputs are handwritten letters, symbols, words or other written images, may be incorporated into a document at locations identified by the location codes. Thus, even in the absence of a formatted template, the layout of a document, such as the previously described letter, may be achieved using the location information identifying the location within the document at which the information is to be entered. For example, the address of the drafter, address of the recipient, body and closing of the letter, and remaining components, may be entered on the paper at the appropriate location. Using the coded location information captured by the scanner, the words or other images forming the contents of the corresponding electronic document are incorporated at the appropriate locations.

Using detected location information, the input device may also interact with the host computing device for entering commands and making selections and the like. Where the computing device is a portable camera or telephone with web browsing properties, the input device may be used in the manner of a stylus or a mouse to select from displayed buttons or menus. Therefore, the input device may be used to activate the browser of the host computer and to select options for retrieving a file, such as the previously described document, even one stored remotely. Using the input device, the user may select downloading of the file containing the information needed by the user. Next, the user may enter annotations to the downloaded file or files via the input device. Those edits may be transmitted to the remote location from which the file was downloaded, where the input device is equipped to perform communications with remote computing devices. Alternatively, the edits may be used to edit the file stored within the input device and/or a host computing device, assuming the input device is in communication with the host computing device.

In another embodiment, the file displayed on the monitor of a host computing device may be a spreadsheet, generated using spreadsheet software such as EXCEL™. The location codes can be used to associate locations with given cells within the spreadsheet. The user may enter a numerical entry in the cell displayed on the screen. At that time, the input device captures images associated with the location of the input device and transmits that information to the host computing device. The processing software located in the host computing device, for example, and working in combination with the spreadsheet software, determines the identity of the cell selected for entry based on the detected location codes, and modifies the spreadsheet document contents accordingly.

The input device may also be used to recall images or other prestored information associated with particular gestures or combination of gestures. For example, the input device may be used to draw a symbol which the processing algorithms device is programmed to recognize. The maze pattern may be used to accurately detect movement of the input device over the pattern so that a particular symbol associated with such movement may be detected. For example, the user may control the input device to draw a symbol on the paper previously identified by the user to be associated with the company logo. The maze pattern may identify a combination of movements corresponding to the letter "M" followed immediately by the letter "S" as an instruction to designate entry of a logo of the Microsoft Corporation. As a result, such prestored information, may be entered within a document by entry of a sequence of previously inputs.

B. Active Coding may Provide Location Information Where the Host Computing Device Includes Sensors for Sensing Movement of the Input Device The input device may also be used as a passive input device. In that mode, the input device may be used in combination with a computing device that senses movement of the input device using resistive sensing, for example. When used in combination with a device that includes a sensor board for detecting movement of an input device, such as a Tablet PC™ or personal data assistant, the input device may function in the manner of a stylus. Using the input device, electronic ink or other image data may be generated with the input device is positioned in very close proximity to the screen. Control functions may be entered in a similar manner. Additionally, the image displayed on the monitor of the particular computing device may also include data corresponding to a code that represents the relative position of that portion of the document. The location information extracted from the object using the camera may then be used to track movement of the input device, as a substitute to, or in combination with, movement detected using sensors of the computing device.

For example, a user may wish to create or modify an image on a portable computing device which already includes the ability to detect positioning of an input device, such as the Tablet PC™ or personal data assistant. The input device may function solely as a passive input device, such that information representing movement of the input device is generated by the computing device. The sensors of the computing device, however, may not have the ability to detected movement of the pen at a range required by the user in a given situation. For example, accurate detection of user inputs may be hindered when the user is traveling in an unstable vehicle. As the user edits a file by moving the input device over the surface of the display of the computing device, the input device may be jostled and displaced a significant distance from the sensor board. Image data captured by the input device may be used to detect movement of the input device within a plane horizontal to the surface of the computing device, even though the signals generated by the sensors of the computing device have become less accurate. Even if the sensors of the computer device are no longer capable of detecting movement of the input device, the image sensor of the input device, may produce sufficient information to maintain an accurate representation of the movement of the input device to reflect the intended inputs of the user. Thus, even when used in combination with a computing device including the capability of sensing movement of the input device, the input device may function either as a passive input device or as an active input device.

II. The Input Device May Operate Using Passive Coding Techniques

A. Passive Coding Provides Location Information for Entering Input Information on a Display or Other Writing Surface The input device may also be used in association with any paper, writing surface or other substrate, to record information corresponding to the handwriting of a user. Again, armed with only the input device and a writing surface, the input device may be used to draft a letter to a client. In this case, gesturing is detected on the basis of passive coding, wherein movements of the input devices are detected using other than codes embedded within the image of a surface of the substrate. For example, the user may draft the letter on a plain sheet of paper. As the user writes with the input device, the image sensor captures images of the paper. Objects within the images may be identified and their movement within the series of captured images are indicative of movement. Sensed objects may include artifacts or other objects on the surface of the paper, which may correspond to a watermark or other defect of the paper. Alternatively, the paper may include ruled lines which may also be used to calculate movement of the pen over the surface. Even in the absence of paper, relative movement of the input device may be determined. The input device could be moved over the surface of a desk, the grain of the wood providing the objects necessary for detecting relative movement of the input device. In a manner similar to that previously described, a user can draft a letter on paper, or any surface over which movement can be detected optically. The movements of the input device may be stored in memory and/or converted into information representing those gestures.

In yet another embodiment, the portable device may be used as a substitute for a portable computing device. For example, having just crafted a solution to the circuit failures associated with her company's pacemaker, but with no laptop or other computing device available, an engineer may turn to her input device as a suitable replacement for recording her thoughts as she travels by train to meet the rest of the design team. Making the most of the time available (and with the ink cartridge removed or the cap in place), on the back of the chair in front of her, the user composes a sketch representing a modification to the suspect electrical circuit in question. She activates the input device, sets it in a mode conducive to generating a sketch (which may, for example, include deactivation of conversions), and begin sketching a simplified design representing a solution to the problem. The input device may then store the file representing the handwritten strokes. Switching out of a sketch mode, notations and references may be jotted down next to relevant portions of the sketch, and those entries incorporated within the image file. For example, the user may switch to a notation mode, in which gestures corresponding to letters are recognized. Thus, she may incorporate a description of her proposed solution along with the sketch. Rather than wait until reaching the medical research center, the operator may choose to transmit the schematic to the rest of the design team for full consideration prior to the scheduled meeting. Such transmission may be achieved any number of ways, including uploading the revised document from the input device to a portable wireless device such as a cellular telephone. The information may then be used to generate an image file such as a VISIO™ document.

Once transmitted to the remaining members of the team, the previously described file corresponding to a sketch of a schematic may be displayed on the monitor of a team member's host computing device. For example, the image and accompanying text may be presented on the display of a desktop computer. By placing the input device in proximity to the image of the file displayed on the monitor, additional annotations may be added to those displayed. In that case, movement of the input device may be detected by measuring the relative movement of objects within images captured by the optical sensor of the input device. Signals generated by the input device may be processed by software stored within the input device, or transmitted to the host computing device for processing. Processing of the detected movement may generate electronic ink, text, or other data representing the notations entered via the input device.

B. Passive Coding May Provide Location Information Where the Host Computing Device Includes Sensors for Sensing Movement of the Input Device The input device may be used in conjunction with a computing device having sensors for detecting movement of the input device, even in the absence of location codes. For example, the input device may be used as a source for generating handwritten notes on a personal data assistant or other computing device designed for use with a stylus. Therefore, while running errands a user may be reminded of and wish to add an item to an existing "to do list." The user retrieves the list stored in a host computing device, such as a personal data assistant. Positioning the tip of the input device over the display of the personal data assistant, the user is able to traverse through menus and make selections to retrieve the desired list. Presented with this list, the user may input checks on the screen of the host device in empty boxes located next to descriptions of tasks already completed. The input device captures images of the screen including data corresponding to the box and transmits that data to the host computing device. Using a processing algorithm for analyzing image data, the host computing device then detects the shape of the box as an object for which an entry may be made. To successfully enter check marks, the image data may be processed to detect movement of the pen over and within the area of the box, the gestures forming the recognized shape of a "check." The host device then modifies the file associated with the list to include a representation of a check within the box. Positioning the input device over the space following the last item in the list, the user enters text describing an additional item. The sensors of the host device detects movement of the input device and generates data representing those inputs. The inputs are converted into text and displayed to the user, along with an empty box.

Similarly, a user of Microsoft Reader, for example, such as a student reading an assigned novel may wish to jot down notes next to the relevant text. The image displayed on the monitor of the portable host device is annotated using the input device. For example, the user positions the input device over the monitor of the host computer, a Tablet PC™ for example, and enters handwritten notes next to the relevant text. The gestures are detected by the sensors of the host device and stored as electronic data which is converted into image data and displayed on the screen. The notes may remain in handwritten form or may be converted into alphanumeric characters. The notes may not be seen without actuation of additional functions, such as activating viewing of appended comments or positioning the input device over highlighting or some other indication that annotations are present. The notes may then be stored in a separate file, or stored with a copy of the electronic version of the novel stored within the host computer.

III. Additional Sensor May Produce Additional Information Indicative of the Relative Position of the Input Device In yet another embodiment, information from additional sensors forming part of the input device may be used to supplement or completely replace other forms of movement detection. Such additional sensors may detect linear acceleration of the input device, angular acceleration, velocity, rotation, depressive force, tilt, changes in electromagnetic fields or any sensed indication of movement or positioning of the input device. Such information may aid in an effort to produce more accurate movement detection. Alternatively, the additional sensors may provide the only information available at a given time. For example, the input device may be used in conjunction with a generally uniform surface, such as blank paper. In such cases, the image captured by the optical sensor may provide insufficient information to consistently and accurately detect movement of the input device. If optical motion detection becomes more difficult, such as if objects for tracking movement of the input device become more difficult to detect, in accordance with one embodiment for optically detecting movement, additional information from the additional sensors may be used to provide more refined motion detection. Specifically, the algorithm or algorithms used to determine position and/or movement may incorporate calculations to factor in the additional information and to thereby supplement movement and/or location detection if the optical motion detection.

If optical detection fails to provide useful results, then the additional sensors may provide the only information with which to detect movement. For example, if the user attempts to sketch out a drawing on the uniform white counter of a laminated countertop, the optical sensing system may sufficient data representative of movement. In that case, the additional sensors may provide sufficient information to generate an acceptably accurate representation of input information.

For example, if the input device moves a sufficient distance from the surface being scanned, the optical sensor unit may not capture an accurate representation of the image provided. In that case, additional information from the additional sensors may be used to compliment data obtained by the image of the object over which the input device is moved. Thus, even if the input device moves an inch or greater from the display over which it is being moved (the "z-axis), sensors within the input device may provide an indication of movement of the pen within the plane of the display, i.e., in the horizontal and vertical directions.

For example, an input device used in conjunction with a laptop computer is positioned on the tray table in front of the user. An image of a document, with a maze pattern incorporated into the background, is displayed on the screen of the laptop. Annotations entered by the user are shown in solid blue ink. The seat belt sign comes on as the airplane experiences turbulence. As the user reaches over the keyboard of the laptop computer and adds another word to the annotation, his hand quickly drifts away from the surface of the screen. Although the image sensor may not accurately detect the lines forming the maze pattern displayed, movement in the x and y axis is measured by the additional sensors incorporated within the input device.

The Impact of the Input Device on the Life of a Document

Figure 8:
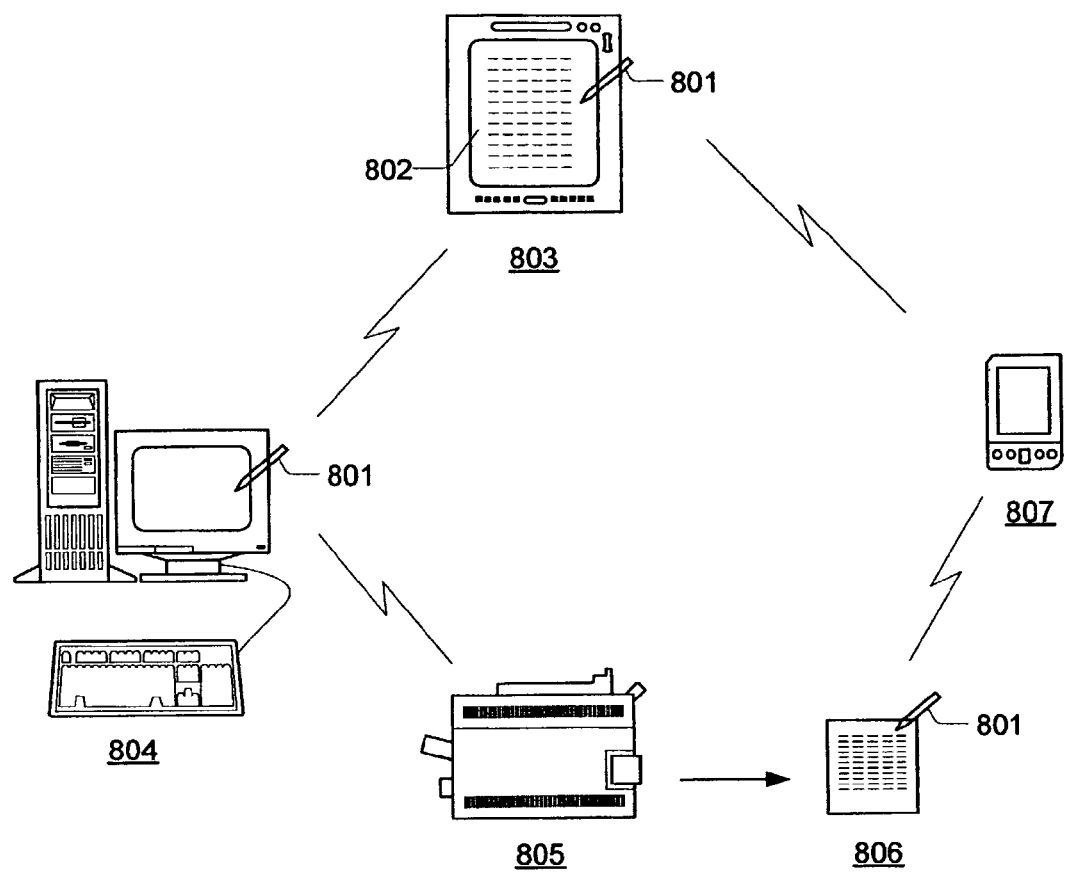
FIG. 8 illustrates uses of an input device in accordance with several illustrative embodiments of the present invention.

FIG. 8 illustrates uses of an input device in accordance with several illustrative embodiments of the present invention, as a document is created, transmitted and edited using an input device in various environments. The following description is merely an illustration of uses of the input device and is not intended to limit the structure or functionality of the present invention.

The input device may be used to extend the life of a document by allowing the creation and/or editing of documents in a wide range of environments and for use in association with numerous devices. Using an input device 801, a document 802 may be electronically created on the screen of one computing device, such as Tablet PC 803 illustrated. For example, the input device may be used to generate a handwritten draft of a document. Electronic ink corresponding to the information entered on the screen of the Tablet PC 803 is generated as the input device functions as a stylus for the Tablet PC 803. The electronic ink may be converted into text form and stored in the Tablet PC 803.

The electronic file representing the document may be transmitted to a second computing device, such as desktop PC 804. In that environment, the document may be edited on the screen of the desktop device using the input device operates as an independent input unit. Because the input device senses relative location of the input device within the displayed image of the document, edits entered on the screen of the desktop device may be reflected in the electronic document, even if the display does not include elements for sensing positioning of the input device. The edits generated using the input device may be transmitted to the desktop PC 804 as they are generated or may stored within the input device for transmission to any PC at a later time. The edits may be entered into the version of the document stored in the desktop PC 804.

The document created may also be output in hard-copy form by a printer, such as printer 805 linked to the desktop PC 804. The hard-copy 806 version of the document may include information or codes designating the relative location of the input device at any location in the document, using a maze-pattern, for example. The hard-copy may be marked-up by one or more users each having an input device, and the edits of each user generated by the separate input device. Along with information representing edits, information identifying the pen used to generate those edits may provided as well. For example, the inputs may be reflected using underlined colored text such as that found in applications for tracking changes made to documents. The edits/inputs may be forwarded from the desktop PC 804 to the Tablet PC 803, for incorporation into that document. Alternatively, the edits may be stored within the input device and uploaded at a later time.

The document may also be output on plain paper, or on any substrate not including indications of relative positioning of the input device. Again, the hard-copy may be marked-up by one or more users having an input device, and the edits of each user generated by the input device. In this example, position or movement of the pen may be determined using coding techniques for optically sensing movement of the input device over the paper. As noted, location/movement may be determined using a comparison algorithm in which the relative position of objects within each frame of image data are detected and used to determine movement of the input device. The resulting edits may be transmitted to the computing device in which the document originated, for example, for updating of the original data file. The edits may be transmitted through a computing device, such as the Pocket PC 807 for transmission to the destination device either through a wireless or wired communication or upon docking the device containing edits in the computing device.

The electronic document may also be transmitted to a second computing device, such as the Tablet PC illustrated. In that environment, the document may be edited on the screen of the tablet device using the input device as a simple stylus. Those inputs may be forwarded from the Tablet PC to the computing device storing the original copy of the document as annotations to the document or as edits for incorporation into that document, for example.

Additional Components

While the description above and accompanying figures depict embodiments utilizing specific components, the addition of components and/or removal of any component depicted is within the scope of the present invention. Similarly, the relocation of various components within the input device structure may be implemented without greatly impacting the accuracy with which the camera or the inertial sensors detect movement of the pen and produce electronic ink. For example, the image sensor may be replaced by or supplemented with a sensing device for detecting properties of the surface or object over which the input device may be moved. Thus, if the maze pattern was formed on the surface of an object such that the pattern could be detected based on the radiation of energy outside the visible light spectrum, reflectance of such energy transmitted to the object, or other such sensing techniques. Sensing of any property of the surface may be detected and used to determine position and/or movement of the input device over the surface of an object. As a further example, a microphone sensing system may be employed such that the microphone detects acoustic reflections or emissions from the object over which the input device is positioned.

The illustrative embodiments described and illustrated above have described an input device implemented in the shape of a pen. Aspects of the present invention are applicable, however, to input devices of any number of shapes and sizes.

Use of such an input device should enable personal computing in any location. Thus, users equipped with the described input device may generate or edit data files regardless of where they may be. Documents and other information may be generated, edited or recorded in an office setting, in a classroom, in a hotel, while in transit, or even on the beach.

As noted, the input device may include a suitable display. Alternative, the display of a host computing device may be used to review documents and images created. The user may select formatting of the document before or after the information, such as text, is input, or may review the document and make changes to the format of the document. Viewing the document created on such a display, in the context of the above example, the user may insert a header including his or her address in the appropriate location.

Although the invention has been defined using the appended claims, these claims are illustrative in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the present invention. Also, where certain units of properties such as size (e.g., in bytes or bits) are used, any other units are also envisioned.

We claim:

1. An input device for generating data representative of hand written strokes, the input device comprising:

an image capturing unit for capturing an image of an area of an object over which the input device is positioned and generating captured image data, said data representative of hand written strokes being determined from location information extracted from said captured image data;

a processor processing the captured image data; and a memory storing data, wherein the object comprises a display of a computing device including an image pattern providing location information of an area on the display, wherein the image of the area over which the input device is positioned includes image data representative of a location of the area of the object, wherein the image data representative of a location of the area of the object includes an image pattern representative of the location of the area of the object, and wherein the image pattern representative of the location of the area of the object includes a portion of a maze-like pattern.

* * * * *